United States Patent
Srinivasan et al.

(10) Patent No.: US 11,381,090 B2
(45) Date of Patent: Jul. 5, 2022

(54) SYSTEMS AND METHODS FOR DYNAMIC CONTROL OF DISTRIBUTED ENERGY RESOURCE SYSTEMS

(71) Applicant: ATMA Energy, LLC, San Antonio, TX (US)

(72) Inventors: Supratim Srinivasan, San Antonio, TX (US); Jaro Nummikoski, San Antonio, TX (US)

(73) Assignee: ATMA Energy, LLC, San Antonio, TX (US)

( * ) Notice: Subject to any disclaimer, the term of this patent is extended or adjusted under 35 U.S.C. 154(b) by 0 days.

(21) Appl. No.: 17/493,946

(22) Filed: Oct. 5, 2021

(65) Prior Publication Data
US 2022/0109303 A1    Apr. 7, 2022

Related U.S. Application Data

(60) Provisional application No. 63/087,860, filed on Oct. 5, 2020.

(51) Int. Cl.
*H02J 3/38* (2006.01)
*H02J 3/32* (2006.01)
(Continued)

(52) U.S. Cl.
CPC .............. *H02J 3/381* (2013.01); *G05B 17/02* (2013.01); *G06Q 30/0283* (2013.01);
(Continued)

(58) Field of Classification Search
None
See application file for complete search history.

(56) References Cited

U.S. PATENT DOCUMENTS 7,248,490 B2    7/2007    Olsen et al.
7,262,694 B2    8/2007    Olsen et al.
(Continued)

FOREIGN PATENT DOCUMENTS

EP    2339713 A3    4/2017
EP    3709232 A1    9/2020
(Continued)

OTHER PUBLICATIONS

Siano et al., "Assessing the benefits of residential demand response in a real time distribution energy market", Feb. 2015, Applied Energy 161 (2016) 533-551. (Year: 2015).*
(Continued)

*Primary Examiner* — Mohammad Ali
*Assistant Examiner* — Kelvin Booker
(74) *Attorney, Agent, or Firm* — Shah IP Law, PLLC

(57) ABSTRACT

The present invention relates to systems and methods for dynamic control of distributed energy resource systems. The disclosed systems and methods provide the ability for coordinated, real-time, and pre-planned control of a network of distributed energy resource systems where each distributed energy resource system is located at a different consumer site. Each distributed energy resource system is operable to provide stored and/or generated energy to meet on-site consumer needs and/or provide energy to the grid. An off-site control system obtains energy usage information from a plurality of the distributed energy resource systems and processes the information in order to coordinate control of each distributed energy resource system such as coordinating if and when each distributed energy resource system provides energy to the grid in order to at least partially meet energy demands associated with a demand response timeframe.

20 Claims, 9 Drawing Sheets

(51) Int. Cl.
*G05B 17/02* (2006.01)
*G06Q 30/02* (2012.01)
*G06Q 50/06* (2012.01)
*H02J 13/00* (2006.01)

(52) U.S. Cl.
CPC .............. *G06Q 50/06* (2013.01); *H02J 3/32* (2013.01); *H02J 13/00006* (2020.01); *H02J 2203/20* (2020.01); *H02J 2300/24* (2020.01)

(56) References Cited

U.S. PATENT DOCUMENTS

| | | | |
|---|---|---|---|
| 7,274,975 B2 | 9/2007 | Miller | |
| 7,385,373 B2 | 6/2008 | Doruk et al. | |
| 7,550,952 B2 | 6/2009 | Kurokami et al. | |
| 8,352,091 B2 | 1/2013 | Haugh | |
| 8,855,794 B2 | 10/2014 | Imes et al. | |
| 8,872,379 B2 | 10/2014 | Ruiz et al. | |
| 8,884,463 B2 | 11/2014 | Dibachi et al. | |
| 9,136,712 B2 | 9/2015 | Reineccius et al. | |
| 9,246,334 B2 | 1/2016 | Ansari et al. | |
| 9,406,094 B2 | 8/2016 | Kearns et al. | |
| 9,418,392 B2 | 8/2016 | Kearns et al. | |
| 9,559,521 B1 | 1/2017 | King | |
| 9,600,046 B2 | 3/2017 | Smith et al. | |
| 9,634,508 B2 | 4/2017 | Kearns et al. | |
| 9,645,596 B1 | 5/2017 | Lee et al. | |
| 10,291,029 B2 | 5/2019 | Parashar et al. | |
| 10,340,702 B2 | 7/2019 | Narla | |
| 10,389,126 B2 | 8/2019 | Kearns et al. | |
| 10,516,268 B2 | 12/2019 | Khaitan et al. | |
| 10,571,947 B2 | 2/2020 | Burlinson et al. | |
| 10,693,294 B2 | 6/2020 | Kearns et al. | |
| 10,747,252 B2 | 8/2020 | Kearns et al. | |
| 10,756,543 B2 | 8/2020 | Detmers et al. | |
| 10,768,652 B2 | 9/2020 | Burlinson et al. | |
| 10,782,721 B2 | 9/2020 | Erhart et al. | |
| 10,804,710 B2 | 10/2020 | Smith | |
| 10,901,489 B2 | 1/2021 | Smith et al. | |
| 2002/0013689 A1 | 1/2002 | Hunton | |
| 2004/0262996 A1 | 12/2004 | Olsen et al. | |
| 2004/0263116 A1 | 12/2004 | Doruk et al. | |
| 2005/0280528 A1 | 12/2005 | Olsen et al. | |
| 2005/0281064 A1 | 12/2005 | Olsen et al. | |
| 2007/0005195 A1 | 1/2007 | Pasquale et al. | |
| 2008/0039979 A1* | 2/2008 | Bridges | B60L 55/00 700/286 |
| 2008/0039980 A1* | 2/2008 | Pollack | B60L 53/64 700/295 |
| 2008/0040223 A1* | 2/2008 | Bridges | B60L 53/14 705/40 |
| 2008/0040263 A1* | 2/2008 | Pollack | B60L 53/14 705/39 |
| 2008/0040295 A1* | 2/2008 | Kaplan | B60L 53/64 705/412 |
| 2008/0040296 A1* | 2/2008 | Bridges | B60L 53/305 705/13 |
| 2008/0052145 A1* | 2/2008 | Kaplan | B60L 53/63 705/7.31 |
| 2009/0066287 A1* | 3/2009 | Pollack | H02J 13/00028 180/65.21 |
| 2010/0217550 A1* | 8/2010 | Crabtree | H02J 3/007 702/62 |
| 2013/0207591 A1 | 8/2013 | Reineccius | |
| 2013/0345888 A1* | 12/2013 | Forbes, Jr. | H02J 3/14 700/291 |
| 2013/0346768 A1* | 12/2013 | Forbes, Jr. | G05F 1/66 713/310 |
| 2014/0039703 A1* | 2/2014 | Forbes, Jr. | H02J 13/00004 700/286 |
| 2014/0049109 A1 | 2/2014 | Kearns et al. | |
| 2014/0052305 A1 | 2/2014 | Kearns et al. | |
| 2014/0058577 A1 | 2/2014 | Erhart et al. | |
| 2014/0067151 A1 | 3/2014 | Erhart et al. | |
| 2014/0070617 A1 | 3/2014 | Detmers et al. | |
| 2014/0070756 A1 | 3/2014 | Kearns et al. | |
| 2014/0074311 A1 | 3/2014 | Kearns et al. | |
| 2014/0088781 A1 | 3/2014 | Kearns et al. | |
| 2014/0114850 A1* | 4/2014 | Forbes, Jr. | H02J 13/00 705/40 |
| 2014/0214226 A1 | 7/2014 | Reineccius et al. | |
| 2014/0324241 A1 | 10/2014 | Smith et al. | |
| 2015/0123601 A1 | 5/2015 | Smith | |
| 2016/0342170 A1 | 11/2016 | Kearns et al. | |
| 2017/0192490 A1 | 7/2017 | Smith et al. | |
| 2017/0229896 A1 | 8/2017 | Kearns et al. | |
| 2017/0329361 A1 | 11/2017 | Burlinson et al. | |
| 2017/0331290 A1 | 11/2017 | Burlinson et al. | |
| 2018/0075548 A1* | 3/2018 | Madonna | G06Q 50/06 |
| 2020/0112199 A1 | 4/2020 | Rao | |
| 2020/0259336 A1 | 8/2020 | Rao et al. | |
| 2020/0371540 A1 | 11/2020 | Kearns et al. | |
| 2021/0077842 A1 | 3/2021 | Skoskiewicz | |
| 2021/0083506 A1 | 3/2021 | Rao et al. | |
| 2021/0088565 A1 | 3/2021 | Lu et al. | |
| 2021/0207641 A1 | 7/2021 | McPheeters et al. | |

FOREIGN PATENT DOCUMENTS

| | | |
|---|---|---|
| EP | 3726698 A1 | 10/2020 |
| WO | 01/090763 A3 | 11/2001 |
| WO | 2010/101963 A2 | 9/2010 |
| WO | 2011/008505 A2 | 1/2011 |
| WO | 2011/008506 A2 | 1/2011 |
| WO | 2011/120435 A1 | 10/2011 |
| WO | 2013/101862 A1 | 7/2013 |
| WO | 2013/101865 A1 | 7/2013 |
| WO | 2013/101868 A1 | 7/2013 |
| WO | 2016/135508 A1 | 9/2016 |
| WO | 2020/073009 A1 | 4/2020 |
| WO | 2021/055608 A1 | 3/2021 |

OTHER PUBLICATIONS

Ruzbahani et al., "Smart Households Demand Response Management with Micro Grid", Feb. 2019, 2019 IEEE Power & Energy Society Innovative Smart Grid Technologies Conference (ISGT). (Year: 2019).*

Palensky et al., "Demand Side Management: Demand Response, Intelligent Energy Systems, and Smart Loads", Aug. 2011, IEEE Transactions On Industrial Informatics, vol. 7, No. 3. (Year: 2011).*

Logenthiran et al., "Demand Side Management in Smart Grid Using Heuristic Optimization", Jul. 2011, IEEE Transactions on Smart Grid, vol. 3, No. 3, Sep. 2012. (Year: 2011).*

Logenthiran et al., "Particle Swarm Optimization for Demand Side Management in Smart Grid", Nov. 2015, 2015 IEEE Innovative Smart Grid Technologies—Asia (ISGT ASIA). (Year: 2015).*

Hafeez et al., "A Modular Framework for Optimal Load Scheduling under Price-Based Demand Response Scheme in Smart Grid", Jul. 2019, Processes 2019, 7, 499; doi:10.3390/pr7080499. (Year: 2019).*

* cited by examiner

SYSTEMS AND METHODS FOR DYNAMIC CONTROL OF DISTRIBUTED ENERGY RESOURCE SYSTEMS

CROSS-REFERENCE TO RELATED APPLICATIONS

This application claims the benefit of U.S. Provisional Application No. 63/087,860, filed Oct. 5, 2020, which is incorporated herein by reference.

BACKGROUND

Field of Art

The presently disclosed invention relates in general to the field of energy management for a utility provider, and in particular, to systems and methods for identifying and controlling the operation of distributed energy resources, such as those located at the site of a consumer, in order to meet requests for energy, such as requests from utility providers associated with demand response.

Background

Electric utility providers routinely encounter periods of high electric energy demand such as periods of a day when a large number of consumer sites are in active need of electric energy. The cost to generate the electric energy needed to satisfy these periods of peak energy usage is substantially greater than periods of off-peak usage. As an alternative to generation, utility providers may look to purchase energy from other sources as a means to reduce the amount of electric energy that must be generated which in turn can help lower the cost of electric energy and put less strain on the electric generation components of an electric utility provider. However, the availability of energy that can be purchased may be inconsistent and dependent on external factors which are difficult to predict.

Renewable energy systems installed on-site at the location of a consumer continue to gain popularity. For example, the number of solar panel systems installed on residential properties continues to increase. With this increase in renewable energy systems, often there is a surplus of unused energy generated by these systems as energy usage fluctuates throughout a day. While it may seem like a solution to this surplus would be to feed the unused energy back into the grid, this can lead to grid congestion at times depending on the supply and demand variations throughout a day. One solution to help with the surplus energy, reduce grid congestion, and at the same time provide a benefit to the consumer of being able to have power during times of outages, is to install an on-site energy storage system (e.g. a battery) at the location of the consumer directly coupled with the renewable energy system in order to provide the consumer with on-site energy back up.

However, there are various problems associated with existing on-site energy storage systems for renewable energy systems. Some common problems with traditional systems include significant waste when a consumer doesn't use the stored energy, there can be huge spikes in demand on the grid, electricity is more expensive for all including the electric company, consumers typically bear the cost of these on-site storage systems, and a general lack of coordinated control of these different systems presents challenges to optimizing the use of stored energy, preventing grid congestion, and accessing the energy when it is most needed such as during demand response time periods. Furthermore, due in part to legal restrictions, the architecture of existing consumer based storage systems is generally configured in a way that the consumer owns or has control of the storage system and control over decisions regarding use of the stored energy, which may leave utility providers with uncertainty regarding availability of energy from a given consumer at a given time making it difficult to plan for demand response events.

SUMMARY

The present invention addresses the issues identified above by providing the utility company the ability to control these energy stores and without requiring the utility company to purchase the energy from the consumer thereby allowing the utility company to anticipate spikes in demand and controlling discharge of storage systems accordingly, eliminate waste and reduce overall cost of energy. Furthermore, the present invention reduces the cost incurred by a consumer for an on-site energy storage system which would typically be associated with installing an on-site renewable energy system.

This is accomplished by installing the on-site energy storage system on the utility company's side or grid-side of the on-site utility billing meter thereby allowing the utility provider control over use of the stored energy as opposed to the conventional approach of installing the on-site energy storage system on the consumer side of the utility billing meter where the use of energy in the storage system would be subject to consumer decisions. In addition, in this configuration, the consumer may not incur the cost to purchase the on-site energy storage system, but may still use the storage to power on-site demands and avoid interruptions in service such as during a power outage.

The present invention also provides for coordinated remote control of a plurality of on-site storage systems in order to provide energy to meet off-site demands. By obtaining usage data associated with a plurality of distributed energy resource systems (each of which may include an on-site storage system), a remote, off-site controller is operable to identify and control the distributed energy resource systems in accordance with a utility provider's needs or requests for energy. The systems and methods disclosed herein provide a means for installing utility provider owned equipment on the grid side of a consumer's billing meter in a fashion that allow for utility provider control and access to the energy from the distributed energy resource systems at the utility providers discretion.

BRIEF DESCRIPTION OF THE DRAWING FIGURES

The foregoing and other objects, features, and advantages of the invention will be apparent from the following more particular description of embodiments as illustrated in the accompanying drawings, in which reference characters may refer to the same parts throughout the various views. The drawings are not necessarily to scale, emphasis instead being placed upon illustrating principles of the invention.

DETAILED DESCRIPTION OF EMBODIMENTS

While various aspects and features of certain embodiments have been summarized above, the following detailed description illustrates a few exemplary embodiments in further detail to enable one skilled in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this application the use of the singular includes the plural unless specifically stated otherwise, and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Figure 1:
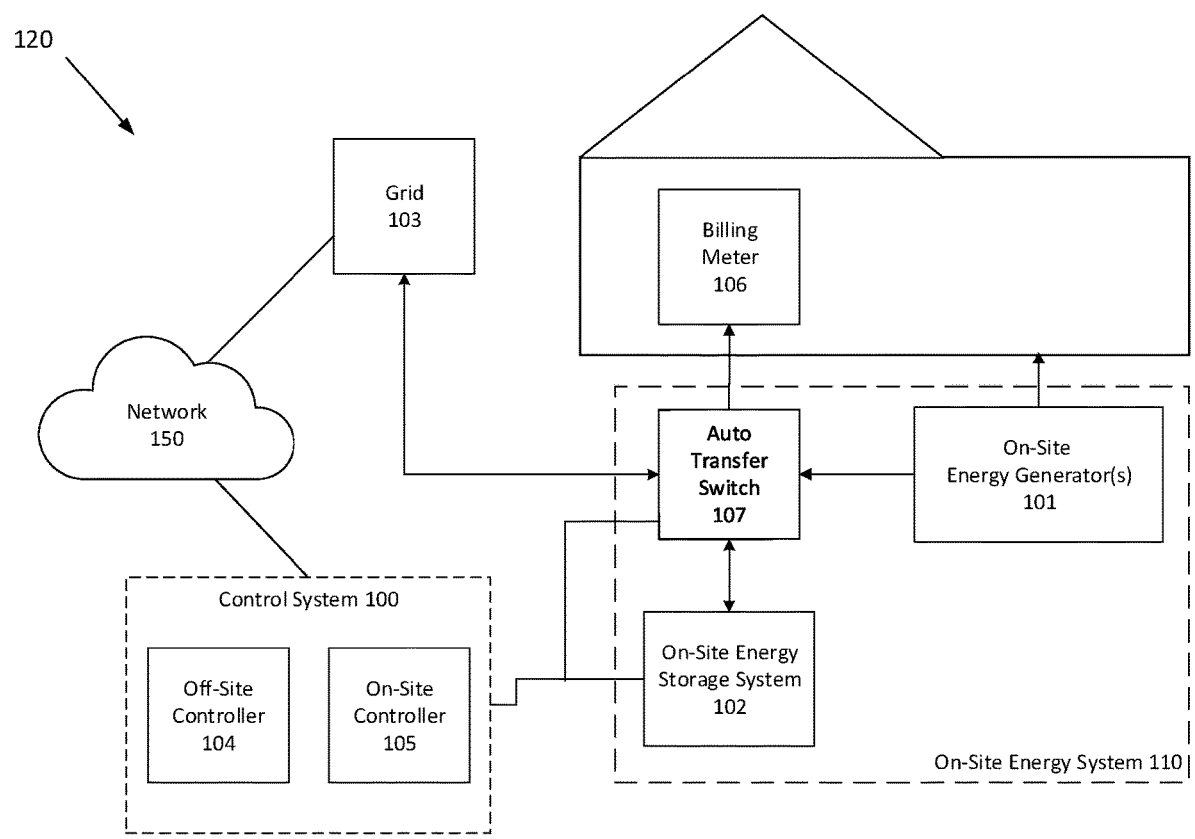
FIG. 1 illustrates a schematic drawing of a system for energy management by a utility company.

FIG. 1 illustrates an exemplary system 120 for controlling distributed energy resource system(s) to provide energy to meet consumer and/or grid needs. The system 120 comprises an on-site energy system 110 including on-site energy generator(s) 101, an on-site energy storage system 102, and an auto transfer switch 107, a billing meter 106, a grid 103, a network 150, and a control system 100, which is further comprised of an off-site controller 104, and an on-site controller 105. Generally, the system enables energy that is generated at the on-site energy generator 101 to be used to meet on-site energy demands, stored in the on-site energy storage system 102, and/or fed into the grid 103 to meet off-site demands.

The on-site energy system 110 generally comprises on-site energy generator(s) 101, an on-site energy storage system 102, and an auto transfer switch 107. The on-site energy system 110 may also comprise an on-site controller or otherwise be associated with and in communication with an on-site controller 105. The on-site energy system 110 may be one of a plurality of on-site energy storage systems each located at a different consumer site and each considered a distributed energy resource system and part of a network of distributed energy resource systems. Additional details associated with the system architecture of the on-site energy system 110 and the integration of the on-site energy system 110 with other components is depicted in FIG. 2B and described in the corresponding description below.

The one or more on-site energy generator(s) 101 generate energy from hardware that is installed on-site, including but not limited to residential, commercial or industrial buildings. The on-site energy generator(s) 101 may be or comprise renewable energy generation unit(s) such as solar or photovoltaic (PV) cells. Other types of renewable energy generation units may be used in place of, or in addition to, solar cells including at least wind based, water based and geothermal based energy generation units. Furthermore, on-site energy generator(s) 101 may be or comprise non-renewable energy generation units in place of, or in addition to, renewable energy generation units including at least fuel burning based energy generation units.

The on-site energy storage system 102 may be used to meet on-site loads and/or feed energy into the grid 103 for distribution, e.g. by a utility company, to meet other off-site loads. The on-site energy storage system 102 may include an energy storage unit such as a battery. Other forms of on-site energy storage may also be used such as thermal or mechanical based energy storage systems (e.g. pumped hydroelectric or compressed air systems). While not depicted in FIG. 1, the system may also comprise a power conversion system(s) for converting energy as necessary to interface with the different components of the system and grid as each may require transmitting/receiving energy in different forms as would be recognized by one of ordinary skill in the art.

The control system 100 serves to control the amount of energy stored in the on-site energy storage system 102 and control the overall flow of energy from the on-site energy generator(s) 101, to/from the on-site energy storage system 102, to/from the grid 103 and to the billing meter 106 via an auto transfer switch 107. In one aspect, the control system 100 comprises an off-site controller 104 and an on-site controller 105, although a single controller could be used as would be apparent to one of ordinary skill in the art. The on-site controller 105 may be located at the consumer site or may be located remote from the consumer site. The control system 100 including the on-site controller 105 and off-site controller 104 may generally be and/or comprise hardware and/or software as discussed under the "Hardware Architecture" section below. The control system 100 interfaces with the grid 103 via a network 150.

The control system 100 is operable to obtain an electrical signal associated with a demand response curve, obtain energy usage information from one or a plurality of distributed energy resource system(s), such as the on-site energy system 110 depicted in FIG. 1, processes the obtained energy usage information in order to identify at least one distributed energy resource system for providing energy to the grid 103 in association with the demand response curve, and provide instructions to control distributed energy resource system(s). For example, control system 100 receives a request for energy from a utility provider wherein the request for energy comprises a demand response curve indicating the amount of energy needed over a period of time. In response to the request for energy, control system 100 identifies one or more distributed energy resource system(s) that can provide energy to the grid in order to at least partially meet the grid needs associated with the demand response curve. Control system 100 provides instructions to control the identified distributed energy resource system(s) to provide energy at an appropriate timing and rate in association with the demand response curve. The control system 100 will be described in more detail with respect to FIGS. 2A-B and FIG. 3 below.

Network cloud 150 generally represents a network or collection of networks (such as the Internet or a corporate intranet, or a combination of both) over which the various components illustrated in FIG. 1 (including other components that may be necessary to execute the system described herein, as would be readily understood to a person of ordinary skill in the art). In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network 150 or a combination of two or more such networks 150. One or more links connect the systems and databases described herein to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable network 150, and any suitable link for connecting the various systems and databases described herein.

The network 150 connects the various systems and computing devices described or referenced herein. In particular embodiments, network 150 is an intranet, an extranet, a virtual private network (VPN), a local area network (LAN), a wireless LAN (WLAN), a wide area network (WAN), a metropolitan area network (MAN), a portion of the Internet, or another network or a combination of two or more such networks 150. The present disclosure contemplates any suitable network 150.

One or more links couple one or more systems, engines or devices to the network 150. In particular embodiments, one or more links each includes one or more wired, wireless, or optical links. In particular embodiments, one or more links each includes an intranet, an extranet, a VPN, a LAN, a WLAN, a WAN, a MAN, a portion of the Internet, or another link or a combination of two or more such links. The present disclosure contemplates any suitable links coupling one or more systems, engines or devices to the network 150.

In particular embodiments, each system or engine may be a unitary server or may be a distributed server spanning multiple computers or multiple datacenters. Systems, engines, or modules may be of various types, such as, for example and without limitation, web server, news server, mail server, message server, advertising server, file server, application server, exchange server, database server, or proxy server. In particular embodiments, each system, engine or module may include hardware, software, or embedded logic components or a combination of two or more such components for carrying out the appropriate functionalities implemented or supported by their respective servers. For example, a web server is generally capable of hosting websites containing web pages or particular elements of web pages. More specifically, a web server may host HTML files or other file types, or may dynamically create or constitute files upon a request, and communicate them to clients devices or other devices in response to HTTP or other requests from clients devices or other devices. A mail server is generally capable of providing electronic mail services to various client devices or other devices. A database server is generally capable of providing an interface for managing data stored in one or more data stores.

In particular embodiments, one or more data storages may be communicatively linked to one or more servers via one or more links. In particular embodiments, data storages may be used to store various types of information. In particular embodiments, the information stored in data storages may be organized according to specific data structures. In particular embodiments, each data storage may be a relational database. Particular embodiments may provide interfaces that enable servers or clients to manage, e.g., retrieve, modify, add, or delete, the information stored in data storage.

The system may also contain other subsystems and databases, which are not illustrated in FIG. 1, but would be readily apparent to a person of ordinary skill in the art. For example, the system may include databases for storing data, storing features, storing outcomes (training sets), and storing models. Other databases and systems may be added or subtracted, as would be readily understood by a person of ordinary skill in the art, without departing from the scope of the invention.

Figure 2A:
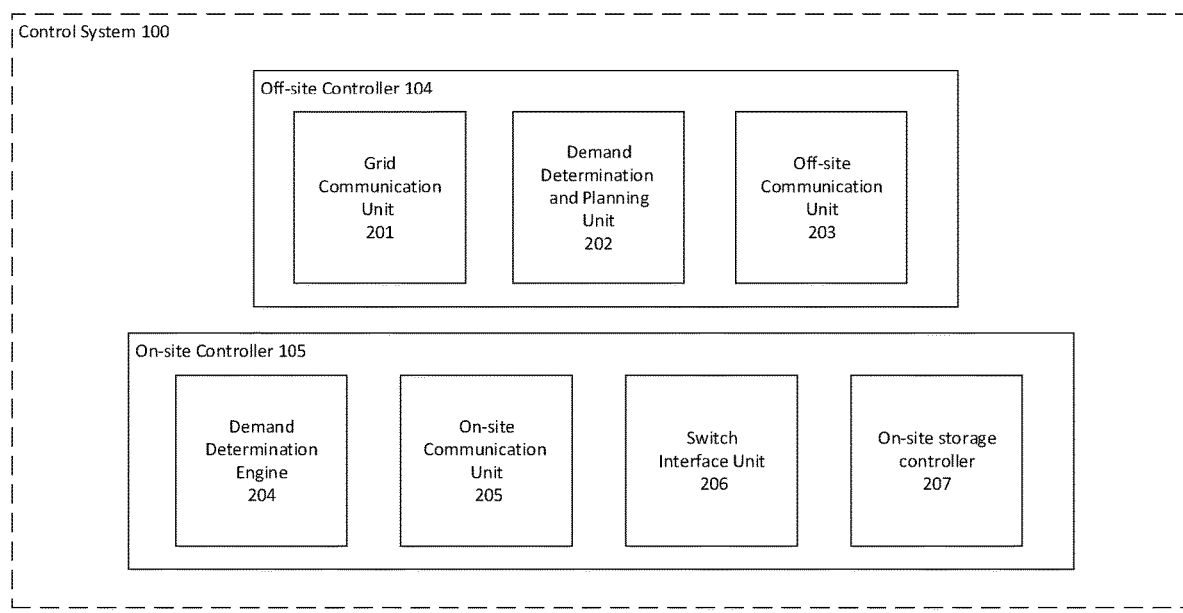
FIG. 2A illustrates the components of a control system for use within a system for energy management by a utility company.
Figure 2B:
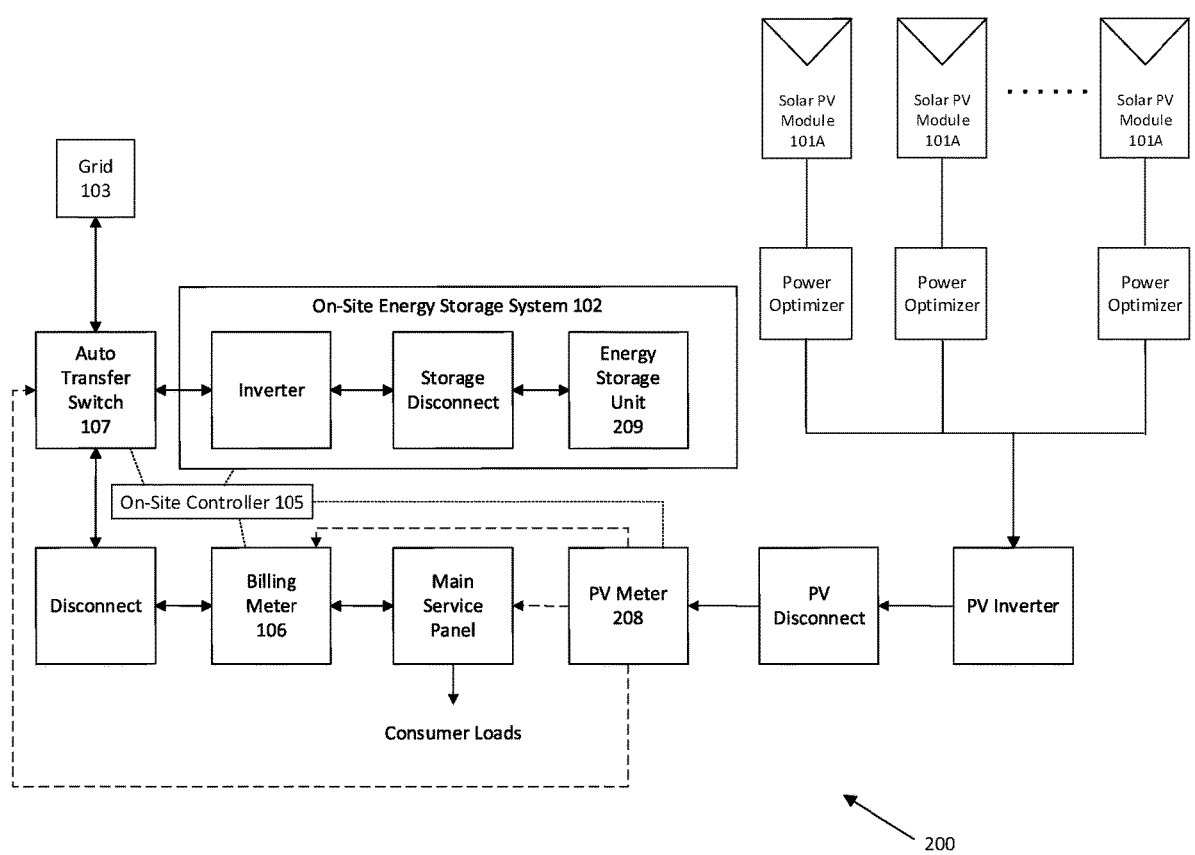
FIG. 2B illustrates an exemplary system architecture according to one embodiment of the disclosed invention.

FIG. 2A further illustrates the control system 100 that was briefly described in reference to FIG. 1. In one embodiment, the control system 100 comprises an off-site controller 104 and an on-site controller 105. It is noted that the separation of components into different controllers and units is exemplary and for the purposes of explanation and that multiple controllers, units, components and the like can be combined as desired such that a single component provides multiple or all functions of the control system 100 as disclosed herein without departing from the scope of the invention. The off-site controller 104 may include a grid communication unit 201, a demand determination and planning unit 202, and an off-site communication unit 203. The on-site controller 105 may include a demand determination engine 204, an on-site communication unit 205, a switch interface unit 206, and an on-site storage controller 207. The various elements enable the control system 100 to control the discharge of the on-site energy storage system 102 as a function of on-site demands and grid demands.

The off-site controller 104 receives energy distribution requests via grid communication unit 201, assesses availability of energy via demand determination and planning unit 202 based on real time and previous data received from the off-site communication unit 203 which sends and receives energy status updates to and from at least one on-site controller 105. These status updates may include energy usage information related to on-site energy generation, on-site demands, and energy stored in the associated on-site energy storage system 102.

In one aspect, the off-site controller 104 is operable to communicate with a plurality of on-site controllers wherein each on-site controller is associated with a single on-site energy system, or other distributed energy resource system. In one aspect, the off-site controller 104 is operable to communicate with a plurality of on-site controllers wherein each on-site controller is associated with a plurality of on-site energy systems, or other distributed energy resource systems, such as a batch or group of distributed energy resource systems that are collectively part of the same feeder circuit.

The grid communication unit 201 of the off-site controller 104, communicates with the grid 103 to receive energy distribution requests. The grid communication unit 201 may be wireless such as a global system for mobile communications (GSM) or general packet radio service (GPRS) module or may be hardwired for communication over a network such as described in detail above. The grid communication unit 201 may receive an electrical signal associated with a request to provide energy to the grid, wherein the electrical signal is associated with a demand response curve indicating the electric energy demands as a function of time associated with the request.

In one embodiment, the energy distribution requests may come in the form of a demand response signal. Utility companies may rely on a distributed energy resource management system (DERMS) in order to plan, manage and request energy from a variety of distributed energy resources (DERs) such as the on-site energy systems 110 and the like. When a utility company determines the need for energy from a DER, a demand response signal can be communicated to the grid communication unit 201 of the off-site controller 104. This determination by a utility company may be planned in advance via forecasting or may occur spontaneously when an immediate energy need arises.

The demand determination and planning unit 202 assesses the availability of energy within one or more on-site energy storage systems 102. In one embodiment, the demand determination and planning unit 202 may send a request to the one or more on-site energy system 102 at periodic intervals. In another instance, the demand determination and planning unit 202 may query the on-site energy storage system 102 once a request for energy distribution is received by the grid communication unit 201. In one embodiment of the invention, the demand determination and planning unit 202 may convert the information received from the on-site energy storage system 102 into DERM compatible units. DERM compatible units include, but are not limited to: direct current (DC) voltage, DC current, alternating current (AC) voltage, AC current, frequency in Hertz (Hz) and combinations thereof to indicate DC power, DC energy, AC real power, AC apparent power, AC reactive power, and AC energy.

The on-site controller 105 may also be configured to determine available capacity in the distributed energy resources (i.e. a plurality of on-site energy storage systems 102) in real time and provide this information via communication module to the off-site controller 105 in real time. For example, the on-site controller 104 may indicate available capacity as 5 min interval data communicated every 15 mins, however other interval and communication times are included within the scope of the invention as would be recognized by one of ordinary skill in the art. This capacity may be reported as kilowatt-hour (kWh) and/or kilowatt (kW) units, for example, however the invention is not limited to these capacity measurements and any suitable capacity unit may be used as would be recognized by one of ordinary skill in the art. Based on the capacity information the off-site controller 105 receives about the available capacity stored in the on-site energy storage systems 102, the demand determination and planning unit 202 may determine an aggregated capacity across a plurality of distributed on-site energy storage systems 102. This capacity may be determined as megawatt-hour (MWh) and/or megawatt (MW) units for example, however the invention is not limited to these capacity measurements and any suitable capacity unit may be used as would be recognized by one of ordinary skill in the art.

The demand determination and planning unit 202 may also apply forecast models on load and energy production for more granular load planning. Specifically, the configuration of the system above allows access to load data of individual homes, which can be aggregated and visualized in different ways. For example, based on data obtained from one or more on-site controller(s) 104, the demand determination and planning unit 202, may provide a local utility provider with a breakdown of load profiles based on zip codes, for example, or based on the utility provider's internal circuit/feeder/substation demarcation. The data can be used to understand real time load profiles and can be fed into a forecasting algorithm for future planning such as day-ahead planning. These are merely exemplary and not intended to be limiting. For example, load profiles may be based on larger or smaller breakdowns than zip code such as by neighborhood, township or other geographic delineation, by lumping several zip codes or geographic aspects together, or other custom area delineations. In addition, planning may extend beyond day-ahead planning and may include longer or shorter planning intervals such as hours, weeks, etc. as would be apparent to one of ordinary skill in the art.

The off-site communication unit 203 communicates with one or more on-site controllers 105 via respective on-site communication units 205, located at each site equipped with an on-site energy system 110 as depicted in FIG. 1. The off-site communication unit 203 sends inquiries and receives energy status information from the on-site communication unit 205. The on-site communication unit 205 communicates with the off-site communication unit 203 to receive inquiries and respond with information regarding the energy status of the on-site energy system 110. The off-site communication unit 203 and on-site communication unit 205 may be wireless such as a global system for mobile communications (GSM) module or general packet radio service (GPRS) module or may be hardwired for communication over a network such as described in detail above. This energy status information may be current, real-time status information or may be historical information such as patterns of energy usage for the respective on-site energy system 110.

The on-site controller 105 interfaces with the on-site energy system 110 to assess the availability of energy at the on-site location that is associated with the on-site energy system 110. In one embodiment, the on-site controller 105 may be placed at the on-site location. In other instances, the on-site controller 105 may be remote from the on-site location and may communicate with the on-site energy system 110 via the network 150, or other communication means.

In addition to being configured to respond to demand response signals, the demand determination engine 204 may also be configured to assess on-site needs in the absence of demand response signals and control the auto transfer switch in order to provide energy to the site as needed by supplementing the on-site generator(s) 101 with energy from the on-site storage system 102 and/or with energy from the grid 103. The demand determination engine 204 may also determine real time load data and on-site generation and relay this information to the off-site controller 104 periodically. For example, the demand determination engine 204 may evaluate on-site loads and generation at 15 minute intervals and provide periodic updates to the off-site controller 104 every four hours. These time intervals and communication times are simply exemplary and other time intervals and update times are included within the scope of the invention as would be recognized by one of ordinary skill in the art. The logic associated with this demand determination engine 204 will be discussed in more detail below.

The switch interface unit 206 controls the auto transfer switch 107 to allow energy to be provided to the grid as needed. This may include communicating with the on-site storage controller 207 to determine the capacity of stored energy and controlling the on-site storage system to discharge stored energy into the grid 103. This may also include connecting the on-site energy generator(s) 101 to supply energy to the grid 103.

The off-site controller 104 can also perform planning operations and determine the likelihood of available energy for future forecasting. For example, an energy provider may submit a request to the control system 100 for energy for a future day and time such as a day(s) or week(s) in advance. The control system 100 may then rely on demand determination and planning unit 202 to gather data from various on-site controllers 105 regarding the expected availability of energy for a given day/time period. This analysis may be based on historical patterns of usage for each on-site energy system 110 connected to the control system 100 for the given day of the week and time of day for which the request is made. In these scenarios, when the actual day/time arrives and a demand response signal is sent/received, the demand determination engine 204 may still assess the availability of energy to determine that there is in fact a surplus of energy as anticipated by the pattern and planning operations. In other words, the control system 100 does not merely assume that the energy is available as anticipated, but performs an additional check by querying the demand determination engine 204 of each on-site controller 105 to verify that there is sufficient energy to be provided to the grid in order to avoid drawing needed energy from a given on-site energy system 110 and inadvertently creating a power deficit for the given on-site energy system 110.

FIG. 2B illustrates a system architecture associated with an exemplary solar power based distributed energy resource system 200 for use in systems and processes for controlling distributed energy resource system(s) to provide energy to meet consumer and/or grid needs according to one embodiment of the invention. The distributed energy resource system comprises energy generation unit(s) in the form of solar PV module(s) 101A, PV meter 208, billing meter 106, on-site controller 105, auto transfer switch 107, grid 103 and on-site energy storage system 102.

Solar PV module(s) 101A comprise one or more PV cells operable to generate electric current from incident light. In this example, on-site energy generator(s) comprise energy generation unit(s) in the form of solar PV module(s) 101A, however other energy generation units could be used without departing from the inventive concept disclosed herein. Solar PV module(s) 101A generate electric energy which is provided to at least one of the main service panel, billing meter 106 and auto transfer switch 107 depending on the desired installation configuration. Different installation configurations may be available depending on desired set up and terms of use of a renewable energy system such as whether a utility provider owns and controls operations of all or part of the system or whether the consumer owns or leases and controls operations of all or part of the system.

PV meter 208 receives electric energy and measures the amount of energy generated by solar PV module(s) 101A. PV meter 208 provides this information to the on-site controller 105. After passing through PV meter 208, electric energy may be directed to at least one of the main service panel, billing meter 106 and auto transfer switch 107 depending on the desired installation configuration. In this example, PV meter 208 may be connected in a variety of configurations depending on the desired application (e.g. the terms and conditions of use of a solar panel system installed at a consumer site, who owns which components, etc.). For example, PV meter 208 may be connected to provide electric energy to at least one of the main service panel such that generated electric energy can be provided directly to meet consumer loads, the billing meter such that generated electric energy can be directly sold to the consumer, and the auto transfer switch 107 such that generated electric energy can be provided to at least one of the on-site energy storage system 102 to be stored in energy storage unit 209, the grid 103, and to meet consumer loads as instructed by on-site controller 105. In one aspect, PV meter 208 is configured to measure the distribution of energy to each of the components to which energy is directed, such as the main service panel, billing meter 106 and auto transfer switch 107 and provide this information to the on-site controller 105 or an off-site controller. As an alternative to this configuration, all energy may be directed to auto transfer switch 107 which controls distribution of energy to different components and corresponding measurement of such distribution.

Auto transfer switch 107 is operable to connect the various components in accordance with external control such as instructions from the on-site controller 105 or an off-site controller. In one aspect, the auto transfer switch 107 is configured to only allow the on-site energy storage system to be provided with electric energy generated by energy generator(s) 101A and will not allow the on-site energy storage system 102 to store energy provided from the grid 103. Auto transfer switch 107 may comprise at least one energy monitor or meter operable to measure at least one of the amount of energy transferred into and out of the on-site energy storage system, the amount of energy coming from the energy generator(s) 101A, the amount of energy coming from the grid 103, and the amount of energy provided to the billing meter 106. In one aspect, auto transfer switch 107 controls the rates of energy flow between any of the connected components.

On-site controller 105 may communicate with at least one of auto transfer switch 107, on-site energy storage system 102, billing meter 106, and PV meter 208 in order to obtain energy status, flow, and usage information such as the amount of energy being generated, stored, provided to meet on-site consumer loads, and provided to the grid 103. On-site controller 105 is operable to communicate with an off-site controller to provide obtained energy information for off-site processing such as aggregation with information from other on-site controllers of different distributed energy resource systems. On-site controller 105 is operable to receive instructions from an external source such as an off-site controller and relay received instructions or convert instructions into appropriate signals necessary to control the distributed energy resource system components in accordance with received instructions. On-site controller 105 is operable to control necessary components of system 200 to at least one of control the at least one storage unit 209 to provide energy to the grid, control the at least one energy generation unit 101A to provide energy to the grid, and control the at least one energy generation unit 101A to provide energy to the at least one storage unit 209.

Figure 3:
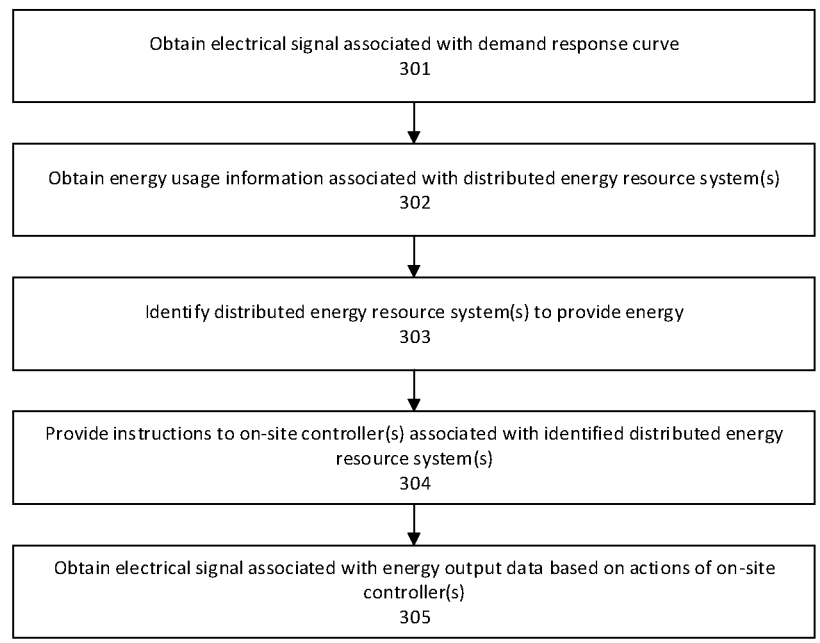
FIG. 3 illustrates an exemplary process for identifying and controlling distributed energy resources according to one embodiment of the disclosed invention.

FIG. 3 illustrates an exemplary process for identifying and controlling distributed energy resources to meet requests for energy. The process comprises obtaining obtaining an electrical signal associated with a demand response curve 301, obtaining energy usage information associated with distributed energy resource system(s) 302, identifying distributed energy resource system(s) to provide energy 303, providing instructions to on-site controller(s) associated with the identified distributed energy resource system(s) 304, and obtaining an electrical signal and energy output data associated with actions of on-site controller(s) 305. This process may be embodied in hardware and/or software such as one or more system controllers or processors configured to perform the steps and a non-transitory computer readable medium comprising instructions that when executed by at least one processor cause the at least one processor to perform the steps.

The exemplary process begins at step 301 by obtaining an electrical signal associated with a demand response curve. The electrical signal may be obtained from a utility provider indicating a request for energy and may be associated with a demand response signal and a demand response curve indicating electric energy needs as a function of time.

At step 302 the process comprises obtaining energy usage information associated with one or a plurality of distributed energy resource system(s), such as on-site energy system as described above. The obtained energy usage information may comprise information associated with energy generation, usage, and storage as well as technical specifications associated with the distributed energy resource system. Examples of energy usage information include, but are not limited to past, present (e.g. real-time) and projected future energy generation, usage and storage associated with each distributed energy resource system, geographic location (e.g. zipcode, latitude and longitude coordinates) of each distributed energy resource system, weather information associated with a geographic location of each distributed energy resource system, incident light associated with the at least one generation unit, age of the at least one storage unit, storage capacity of the at least one storage unit, age of the at least one generation unit, size of the at least one generation unit, and generation capacity of the at least one generation unit.

In one aspect, projected energy generation, usage and storage for a given distributed energy resource system may be computed by an on-site controller and provided to an off-site controller. In one aspect, projected energy generation, usage and storage for a given distributed energy resource system may be computed by an off-site controller or other data processing component based on usage information received from an on-site controller. Regardless of the system component performing the computing, the projected energy generation, usage and storage may be computed based on at least one of past energy generation, usage and storage for that distributed energy resource system during a time period associated with the demand curve and present, real-time energy generation, usage and storage information. For example, projected energy generation, usage and storage information for a specific day of the week and time period of that day may be based on historical usage associated with that day of the week and time period such that the projected energy usage information reflects typical historical usage for the associated day and time period. In one aspect, projected energy generation, storage and usage may incorporate weather forecast information and/or incident light projections based on weather forecast and time of day, each of which may be based on geographic location information associated with a distributed energy resource system. In one aspect, age of the components of the distributed energy resource system are factored into projected energy information computations since storage and generation capabilities of a system may decline with age. These aspects may be used alone, in combination with one another, or in combination with past energy usage information in computing projected energy generation, storage and usage.

At step 303 the process comprises identifying the distributed energy resource system(s) intended to provide energy to the grid in association with the demand response curve. In one aspect, if the request for energy is for immediate energy at the current time, the identifying is based on real-time metrics obtained from the distributed energy resource systems, such as real-time generation, real-time stored energy, and/or real-time on-site demands. In one aspect, if the request for energy is for a future day and time, identifying is based on projected metrics based on any combination of the above examples of energy usage information.

In one aspect, identifying the distributed energy resource system(s) intended to provide energy to the grid comprises identifying batches or groups of distributed energy resource systems to provide energy to the grid. Identifying a batch or group may comprise identifying distributed energy resource systems located in the same zipcode or distributed energy resource systems that are all part of the same feeder circuit. In one aspect, batches may be identified based on at least one of age of the energy storage system, age of the energy generator(s), and decisions to optimize health of distributed energy systems such as balancing which distributed energy resource systems are identified to provide energy to the grid so that some distributed energy resource systems aren't repeatedly burdened with meeting requests for energy while other distributed energy resource systems frequently remain unused in meeting requests for energy.

In one aspect, identifying the distributed energy resource system(s) intended to provide energy to the grid comprises identifying distributed energy resource system(s) with stored energy exceeding a threshold amount. For example, the threshold amount may be a percentage of the max storage capacity of a given distributed energy resource system (e.g. 50%, 75%, 90%, etc.). As another example, the threshold amount may be determined for each distributed energy resource system(s) as the amount of energy usage typically associated with consumer site during the time period associated with the demand response curve.

In one aspect, identifying comprises a first step of aggregating all data from a plurality of distributed energy resource systems to determine if all available or projected available energy is or will be needed. If all energy is needed, then additional analysis to identify which distributed energy resource systems will provide energy may be unnecessary. If the aggregated data indicates that less than all available energy is needed, then analysis of which systems should provide energy may be done. In one aspect, data aggregation may be performed as a function of batches or groups such as batches or groups of distributed energy resource systems in the same general geographic location, such as in the same zipcode or as part of the same feeder circuit. In one aspect, an entire group or any subportion of the systems in the group may be identified as distributed energy resource systems to provide energy. As an alternative to first aggregating all data, a determination of whether the energy from a given distributed energy resource system is needed, may be done systematically on an individual basis such as by computing a running, cumulative available energy total as data from each distributed energy resource system is obtained and analyzed.

In one aspect, identifying comprises identifying a rate and/or duration for providing energy. Each distributed energy resource system may be identified to provide energy to the grid at a rate and/or for a duration that is the same as or different than at least one other distributed energy resource system. For example, a first distributed energy resource system may be identified to provide energy to the grid at a first rate for a first duration while a second distributed energy resource is identified to provide energy to the grid at a second rate for a second duration. As another example, a group or batch of distributed energy resources, may be identified to collectively provide energy to the grid at the same rate and/or for the same duration. In one aspect, the rate may be the maximum capable rate of each distributed energy resource system. In one aspect, the rate may be defined as some percentage of the maximum capable rate. In addition to or alternative to identifying rates and/or durations for providing energy to the grid, rates and/or durations may be identified for energy storing purposes. For example, a first rate and/or duration may be identified for at least one first distributed energy resource system to provide energy to an on-site energy storage system and a second rate and/or duration may be identified for at least one second distributed energy resource system to provide energy to an on-site energy storage system.

At step 304 the process comprises providing instructions to on-site controllers associated with the distributed energy resource system(s) identified to provide energy to the grid. In general, instructions to provide energy to the grid comprise at least one of instructions to discharge an on-site energy storage system to the grid or direct energy from energy generators to grid. In addition, instructions may comprise instructions to direct energy from on-site energy generator(s) to the on-site energy storage system in order to store energy for later discharge and/or instructions to direct energy from on-site energy generator(s) to meet on-site consumer loads. In one aspect, instructions comprise instructions to control an auto transfer switch to connect the necessary components to achieve the appropriate function. For example, the auto transfer switch may be controlled to at least one of connect on-site energy generator(s) to the grid, connect on-site energy generator(s) to the on-site energy storage system, connect the on-site energy generator(s) to the main service panel of the consumer site, connect the on-site energy storage system to the grid, and connect the on-site energy storage system to the main service panel of the consumer site.

In one aspect, the provided instructions may be the same for the duration of the demand response curve or may change over time such that different portions of the demand response curve are associated with different instructions. For example, a first set of instructions for a given distributed energy resource system may comprise instructions to discharge an on-site energy storage system to provide energy to the grid during a first time period associated with the demand response curve and a second set of instructions to stop providing energy to the grid and recharge the on-site energy storage system during a second time period associated with the demand response curve. Furthermore, the provided instructions for at least one distributed energy resource system may be the same as or different than at least one different distributed energy resource system. For example, first instructions may be provided to at least one first distributed energy resource system wherein the first instructions remain unchanged for the duration of the demand response curve while second instructions may be provided to at least one second distributed energy resource system wherein the second instructions change whether or how energy is provided by the second distributed energy resource system at different time periods associated with the demand response curve. These are just a few examples of the different instructions that could be provided and any number of different configurations of instructions may be provided for different time periods associated with a demand response curve.

In one aspect, the instructions provided to one distributed energy resource system or batch of distributed energy resource systems may be the same as or different than another distributed energy resource system or batch of distributed energy resource systems. In one aspect, changes in instructions may be provided on an individual distributed energy resource system basis or on a group or batch basis. In one aspect, only distributed energy resource systems identified in the identifying step are provided with instructions while other distributed energy resource systems continue operating under previously issued instructions or under instruction from an on-site controller which is configured to control default operations outside of external intervention such as that which would occur in association with a demand response curve.

In one aspect, the instructions may be pre-planned or forecasted and provided to systems in advance or may be provided in real-time and updated as needed based on real-time changes. When instructions are pre-planned or forecasted, the process may comprise performing a verification of the instructions prior to providing instructions or prior to activation of the instructions. For example, if instructions to discharge a given on-site energy storage system were determined a day (or more) in advance, a step of verifying the energy available in the on-site energy storage system is adequate or within a threshold amount of the projected amount may be performed. This verifying may be performed within a threshold time period prior to providing instructions or prior to activation of the instructions for the scheduled discharge. Exemplary threshold time periods for comprise verifying within 15 minutes, 30 minutes, 1 hour, etc. of the scheduled discharge, however any threshold time period may be used that provides sufficient time for updating the identifying step should the verification indicate substantially less energy is available than projected.

Each of steps 302, 303 and 304 may be repeated or updated at a predetermined frequency, when a new electrical signal associated with a demand curve is obtained, and/or if new usage information is obtained (such as data pushed from a distributed energy resource system due to a change in available energy or projected use). For example, each step may be repeated at a predetermined frequency such as hourly, every 5 minutes, every 15 minutes, every 30 minutes, etc. in order to perform ongoing real-time data gathering and processing in order to identify and control the distributed energy resource systems in real-time as conditions change. As another example, a new electrical signal associated with a demand curve may be obtained periodically such as when a utility provider changes a previous request for energy and the associated demand curve changes or when a new request for energy is received from the same or different utility provider. Another example of when the steps may be repeated comprises when a distributed energy resource system identifies an internal change to energy availability and pushes this information out to an off-site controller. For example, a projected energy usage calculation may determine that a given distributed energy resource system has stored, unused energy and/or a surplus generation of energy during a particular time period, however due to a change at the consumer site associated with that distributed energy resource system such as an increase in on-site consumer loads. In this scenario, an on-site controller may identify that at least one of stored energy, generated energy, and consumer loads is/are different from the projected calculation by a threshold amount and send updated energy usage information to an off-site controller so that updated analysis can be performed to determine if changes to the identifying step and/or the providing instructions step must be made.

In one aspect, the identifying step 303 and providing instructions step 304 are performed in such a way that on-site demands are prioritized ahead of providing energy to the grid such as described below with respect to FIG. 4.

At step 305 the process comprises obtaining an electrical signal associated with energy output data based on actions associated with each on-site controller. Data obtained in this step may be aggregated over time and used for additional analysis of individual distributed energy resource system performance, batch based distributed energy resource system performance, system wide distributed energy resource system performance, and to identify irregularities and inefficiencies in different areas of the grid or distributed energy resource systems. This obtained data may be used to aid in future iterations of steps 302, 303 and 304 in order to optimize the process and improve performance. The obtained data may be used in machine learning and artificial intelligence to improve projections and planning associated with demand response signals, scheduling of discharging events associated with distributed energy resource systems, assess grid health and age, etc.

Figure 4:
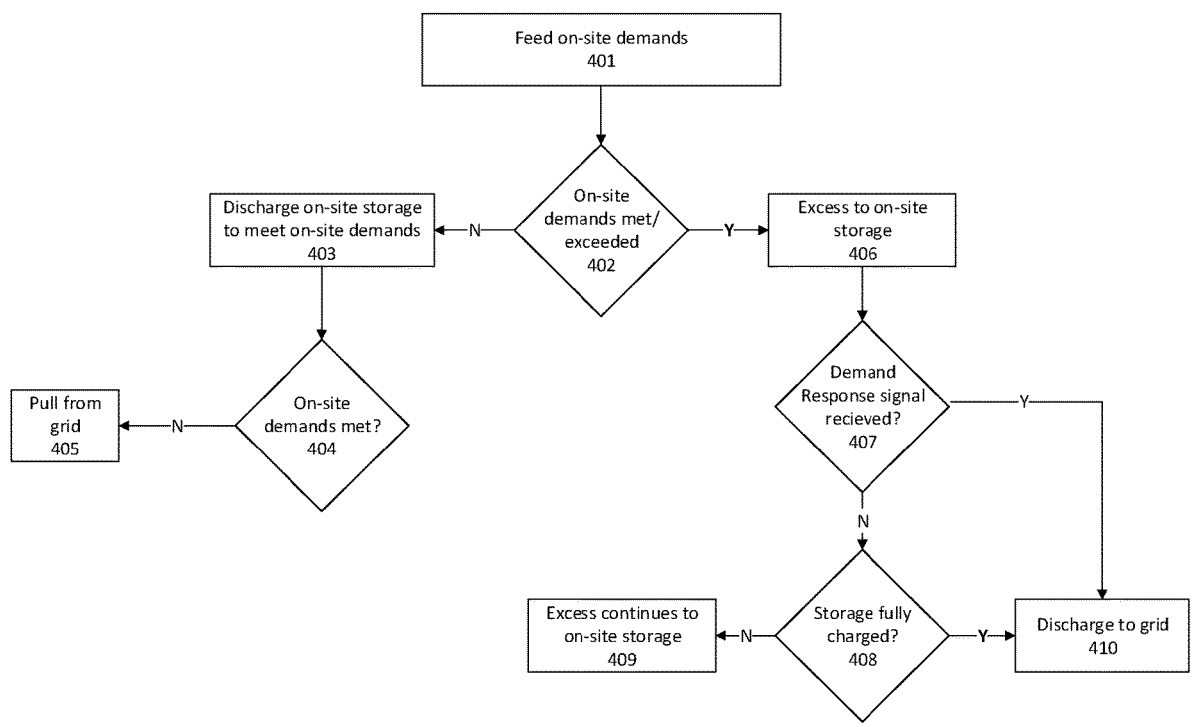
FIG. 4 illustrates a flow chart of the decision making logic of one embodiment of the disclosed invention.

FIG. 4 shows one embodiment where the basic logic of a control system is configured to prioritize on-site demands. At step 401, an on-site controller may control on-site energy flow so that energy from the on-site energy generator(s) is prioritized to feed the on-site demands. In step 402, the on-site controller determines whether on-site demands are being met or exceeded. If it is determined that on-site demands are not being met, the on-site controller controls the on-site storage system and auto transfer switch to discharge stored energy on-site in attempt to satisfy on-site demands at step 403. This energy passes through billing meter allowing a utility company to bill the consumer for this stored energy. At step 404, the on-site controller performs an additional check to determine if on-site demands are met by the additional energy discharged from the on-site storage system. If it is determined that on-site demands are not being met, then in step 405, the on-site controller controls the auto transfer switch to pull energy from the grid in order to meet the on-site demands.

Returning to step 402, if it is determined that on-site demands are exceeded, the on-site controller controls auto transfer switch so that excess generated energy is fed to on-site energy storage system at step 406. At step 407, the on-site controller determines if a demand response signal has been received from the off-site controller. When a demand response signal is not present, the system continues under normal operation to continue charging the on-site storage system. At step 408, the on-site controller determines if the on-site storage system is fully charged.

Returning to step 407, if it is determined that a demand response signal has been received, the on-site controller can control the auto transfer switch and on-site storage system to discharge energy to the grid so that the stored energy can help meet the demands of the grid and the stored energy can be sold to other consumers.

Although in this embodiment, the first priority/step is to feed on-site demands with energy from the on-site energy generator(s), it is noted that other variations of logic are included such as prioritizing charging the on-site storage either from the on-site energy generator(s) or from the grid, or variations where a predetermined percentage of energy is allocated to feeding on-site demands with the remainder allocated to charging the on-site storage system. For example, the system may be configured such that when on-site loads require all or most of the energy being generated by the on-site energy generator(s), the system may pull energy from the grid in order to charge the on-site storage in order to ensure capacity is available for a later time as necessary according to desired planning and forecasting.

Another variation of the above logic includes logic specific for power outage mitigation. In this scenario, the system, via control of the auto transfer switch, may enter an islanding mode wherein the system is isolated from the grid. This may be desirable under certain circumstances such as a grid side power outage in order to isolate the on-site energy system from the grid so that all available capacity stored on-site may be used to meet the on-site loads and effectively eliminate the effects of the power outage for the on-site consumer. By isolating the on-site energy system from the grid via auto transfer switch, this prevents the grid from drawing any energy from the on-site energy storage system, leaving all available capacity for the on-site consumer to have uninterrupted power during a grid side power outage. Other logic variations may be used depending on the desired implementation of the disclosed system architecture.

Hardware Architecture

Generally, the techniques disclosed herein may be implemented on hardware or a combination of software and hardware. For example, each of the above referenced systems, controllers, units and engines may be implemented as software, hardware, software/hardware hybrid, in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a user computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 5:
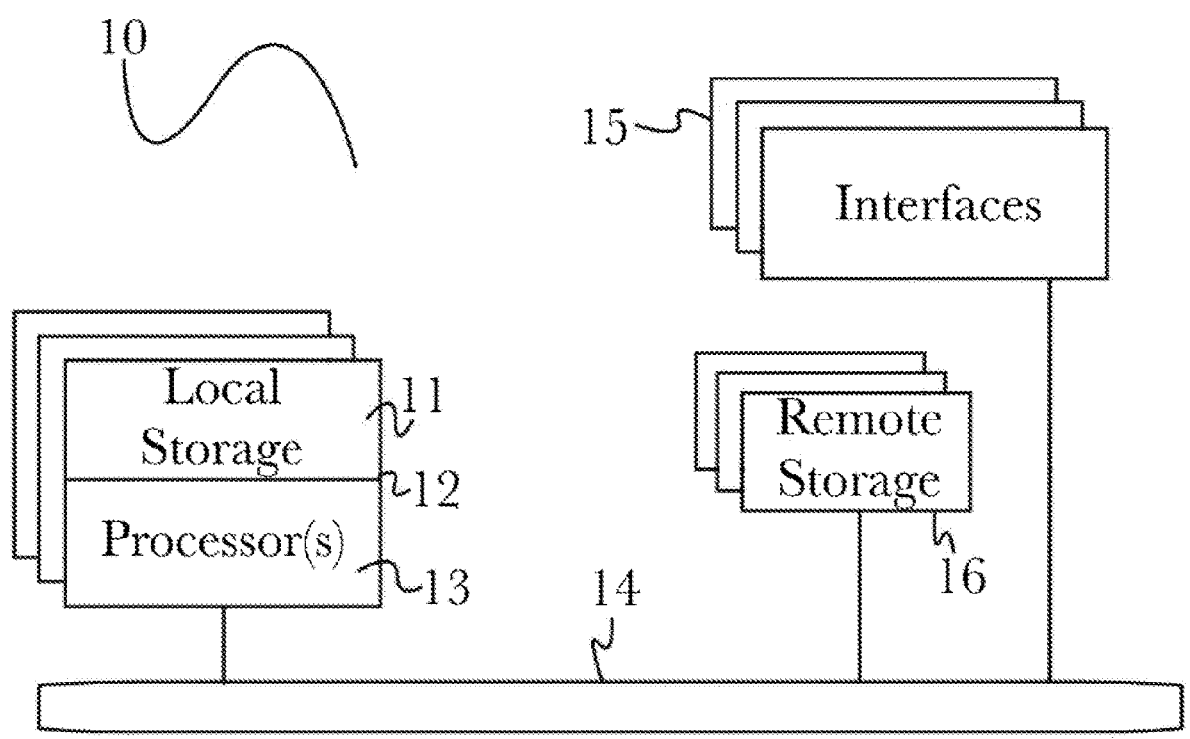
FIG. 5 illustrates a block diagram depicting an exemplary computing device suitable for implementing at least a portion of the features or functionalities disclosed herein.

Referring now to FIG. 5, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients/ users or servers, over communications networks such as a wide area network a metropolitan area network, a local area network, a wireless network, the Internet, or any other network, using known protocols for such communication, whether wireless or wired.

In one aspect, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one aspect, a computing device 10 may be configured or designed to function as a server system utilizing CPU 12, local memory 11 and/or remote memory 16, and interface(s) 15. In at least one aspect, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a particular aspect, a local memory 11 (such as non-volatile random-access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a QUALCOMM SNAPDRAGON™ or SAMSUNG EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one aspect, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 5 illustrates one specific architecture for a computing device 10 for implementing one or more of the embodiments described herein, it is by no means the only device architecture on which at least a portion of the features and techniques described herein may be implemented. For example, architectures having one or any number of processors 13 may be used, and such processors 13 may be present in a single device or distributed among any number of devices. In one aspect, single processor 13 handles communications as well as routing computations, while in other embodiments a separate dedicated communications processor may be provided. In various embodiments, different types of features or functionalities may be implemented in a system according to the aspect that includes a user device (such as a tablet device or smartphone running user software) and server systems (such as a server system described in more detail below).

Regardless of network device configuration, the system of an aspect may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 6:
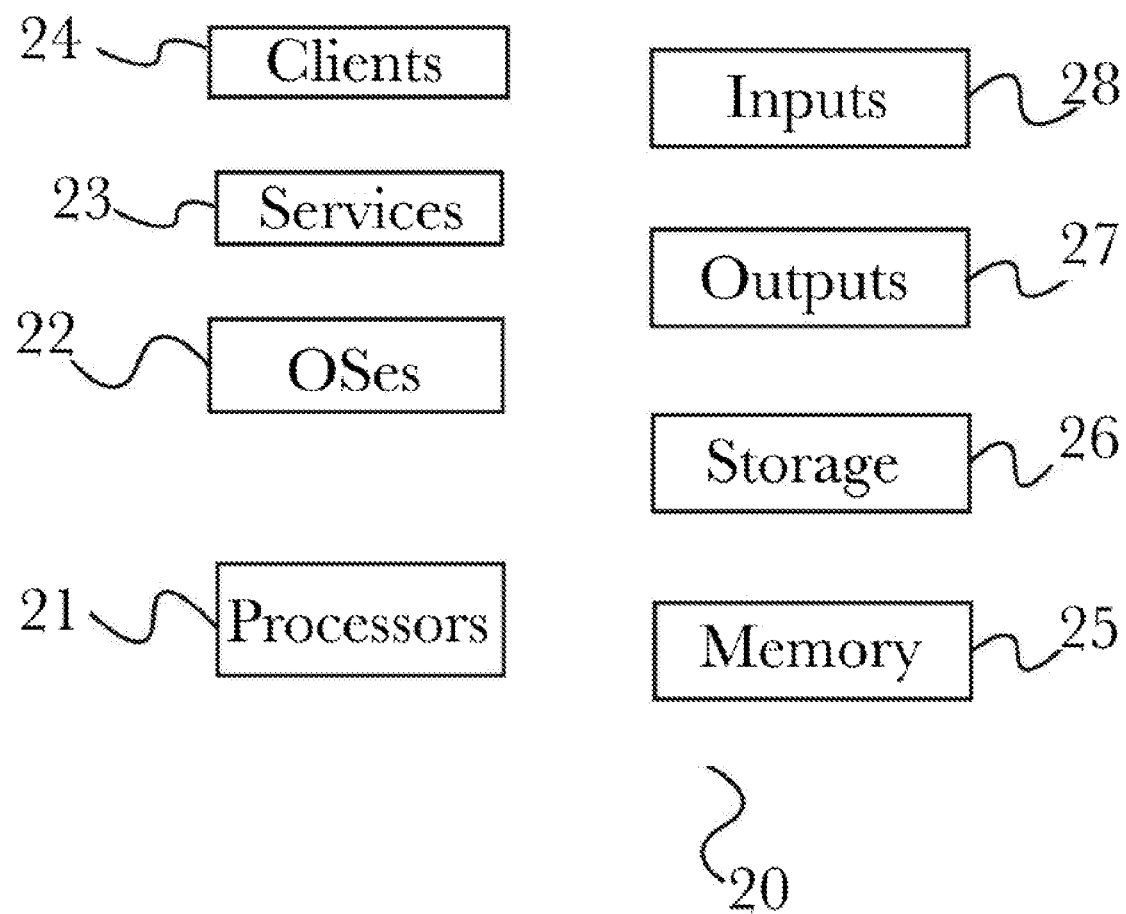
FIG. 6 illustrates a block diagram depicting a typical exemplary architecture of one or more embodiments or components thereof on a standalone computing system.

In some embodiments, systems may be implemented on a standalone computing system. Referring now to FIG. 6, there is shown a block diagram depicting a typical exemplary architecture of one or more embodiments or components thereof on a standalone computing system. Computing device 20 includes processors 21 that may run software that carry out one or more functions or applications of embodiments, such as for example a client application 24. Processors 21 may carry out computing instructions under control of an operating system 22 such as, for example, a version of MICROSOFT WINDOWS™ operating system, APPLE macOS™ or iOS™ operating systems, some variety of the Linux operating system, ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above, referring to FIG. 5). Examples of storage devices 26 include flash memory, magnetic hard drive, CD-ROM, and/or the like.

Figure 7:
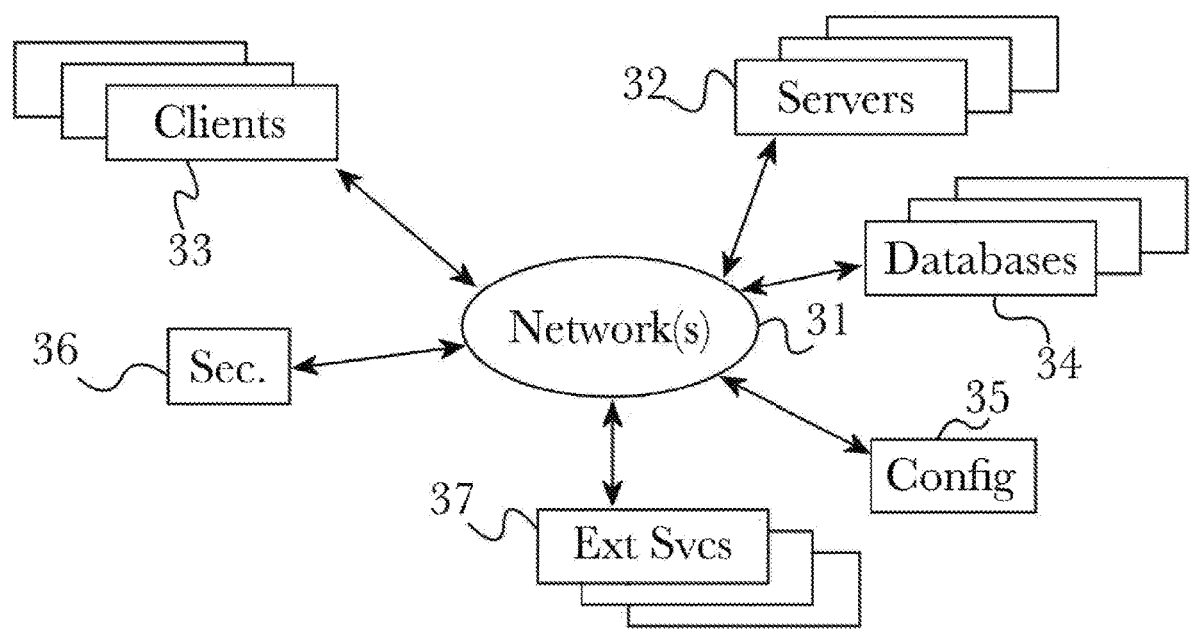
FIG. 7 illustrates a block diagram depicting an exemplary architecture for implementing at least a portion of a system according to one aspect on a distributed computing network.

In some embodiments, systems may be implemented on a distributed computing network, such as one having any number of clients/users and/or servers. Referring now to FIG. 7, there is shown a block diagram depicting an exemplary architecture 30 for implementing at least a portion of a system according to one aspect on a distributed computing network. According to the aspect, any number of clients 33 may be provided. Each client 33 may run software for implementing client-side portions of a system; clients may comprise a system 20 such as that illustrated in FIG. 7. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, WiMAX, LTE, and so forth), or a local area network (or indeed any network topology known in the art; the aspect does not prefer any one network topology over any other). Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in one aspect where client applications 24 are implemented on a smartphone or other electronic device, client applications 24 may obtain information stored in a server system 32 in the cloud or on an external service 37 deployed on one or more of a particular enterprise's or user's premises.

In some embodiments, clients 33 or servers 32 (or both) may make use of one or more specialized services or appliances that may be deployed locally or remotely across one or more networks 31. For example, one or more databases 34 may be used or referred to by one or more embodiments. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, HADOOP CASSANDRA™, GOOGLE BIGTABLE™, and so forth). In some embodiments, variant database architectures such as column-oriented databases, in-memory databases, clustered databases, distributed databases, or even flat file data repositories may be used according to the aspect. It will be appreciated by one having ordinary skill in the art that any combination of known or future database technologies may be used as appropriate, unless a specific database technology or a specific arrangement of components is specified for a particular aspect described herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, some embodiments may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 36 or configuration system 35 or approach is specifically required by the description of any specific aspect.

Figure 8:
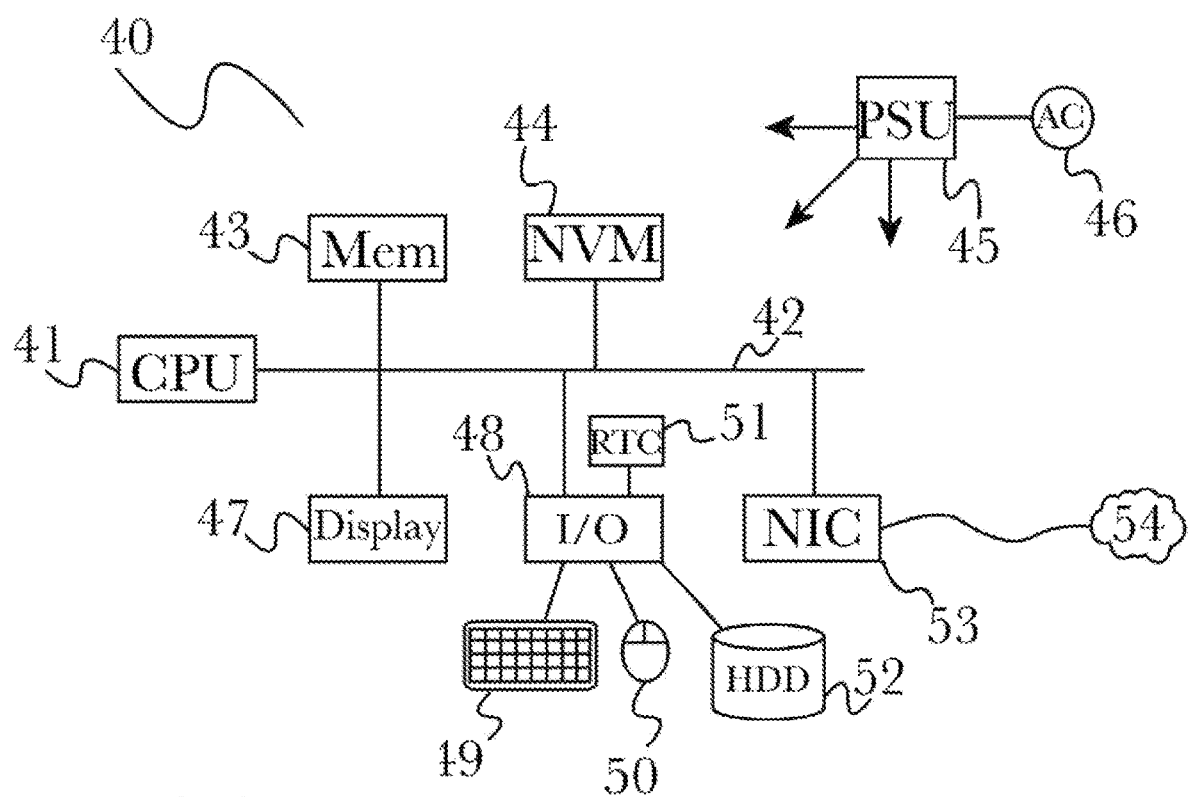
FIG. 8 illustrates an exemplary overview of a computer system as may be used in any of the various locations throughout the system.

FIG. 8 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of various embodiments may be distributed among any number of client/user and/or server components. For example, various software modules may be implemented for performing various functions in connection with the system of any particular aspect, and such modules may be variously implemented to run on server and/or client/user components.

The skilled person will be aware of a range of possible modifications of the various embodiments described above. Accordingly, the present invention is defined by the claims and their equivalents.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

While the invention has been particularly shown and described with reference to certain embodiments thereof, it will be understood by those skilled in the art that various changes in form and details may be made therein without departing from the spirit and scope of the invention.

It should be understood that the foregoing description is only illustrative of the invention. Various alternatives and modifications can be devised by those skilled in the art having the benefit of this disclosure, without departing from the invention. Accordingly, the invention is intended to embrace all such alternatives, modifications and variances.

Certain exemplary embodiments of the disclosure may be described. Of course, the embodiments may be modified in form and content, and are not exhaustive, i.e., additional aspects of the disclosure, as well as additional embodiments, will be understood and may be set forth in view of the description herein. Further, while the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention.

While certain features and aspects have been described with respect to exemplary embodiments, one skilled in the art will recognize that numerous modifications are possible. Further, while various methods and processes described herein may be described with respect to particular structural and/or functional components for ease of description, methods provided by various embodiments are not limited to any particular structural and/or functional architecture.

Hence, while various embodiments are described with or without certain features for ease of description and to illustrate exemplary aspects of those embodiments, the various components and/or features described herein with respect to a particular embodiment can be substituted, added, and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A computer implemented method for identifying and controlling distributed energy resources to meet requests for energy, the computer implemented method comprising:

obtaining an electrical signal associated with a demand response curve, the demand response curve comprising a request to provide electric energy to a grid, the demand response curve indicating electric energy demand over time;

obtaining energy usage information associated with a plurality of distributed energy resource systems, each of the plurality of distributed energy resource systems located at a different consumer site and positioned on the grid side of a billing meter associated with the consumer site, each distributed energy resource system comprising at least one energy storage unit and at least one energy generation unit, the energy usage information obtained by communicating with each of the plurality of distributed energy resource systems, the energy usage information comprising information associated with energy that is at least one of stored in the at least one energy storage unit, and capable of being output by the at least one energy generation unit during a time associated with the demand response curve;

identifying at least one distributed energy resource system in the plurality of distributed energy resource systems for providing energy to the grid, the identifying comprising identifying, based on the obtained energy usage information, at least one distributed energy resource system that can supply at least a portion of electric energy identified in the demand response curve; and providing instructions to a plurality of on-site controllers, wherein each on-site controller is associated with at least one distributed energy resource system and each on-site controller is configured to: control the at least one storage unit to provide energy to the grid, control the at least one energy generation unit to provide energy to the grid, and control the at least one energy generation unit to provide energy to the at least one storage unit, the providing instructions comprises providing instructions to control the at least one storage unit to provide energy to the grid when a first condition is met, control the at least one energy generation unit to provide energy to the grid when a second condition is met, and control the at least one energy generation unit to provide energy to the at least one storage unit when a third condition is met.

2. The computer implemented method according to claim 1, the first condition comprising at least one of identifying electric energy in the at least one energy storage unit exceeds a threshold value and computing that the electric energy in the at least one energy storage unit is needed to meet an electric energy demand associated with the demand response curve.

3. The computer implemented method according to claim 1, the second condition comprising at least one of identifying electric energy in the at least one storage unit is below a threshold value and computing that electric energy capable of being output by the at least one energy generation unit is needed to meet an electric energy demand associated with the demand response curve.

4. The computer implemented method according to claim 1, the third condition comprising at least one of identifying electric energy in the at least one energy storage unit is below a threshold value and computing that the electric energy in the at least one energy storage unit is not needed to meet an electric energy demand associated with the demand response curve.

5. The computer implemented method according to claim 1, wherein for each on-site controller, the instructions comprise at least first instructions associated with a first portion of the demand curve and second instructions associated with a second portion of the demand curve, wherein the first and second portions of the demand curve for at least one on-site controller are different than the first and second portions of the demand curve for at least one different on-site controller.

6. The computer implemented method according to claim 1, wherein for each on-site controller, the instructions comprise at least first instructions associated with a first portion of the demand curve and second instructions associated with a second portion of the demand curve, wherein the first and second portions of the demand curve for at least one on-site controller are the same as the first and second portions of the demand curve for at least one different on-site controller.

7. The computer implemented method according to claim 1, wherein for each on-site controller, the instructions comprise at least first instructions associated with a first portion of the demand curve and second instructions associated with a second portion of the demand curve, wherein the first and second instructions are different.

8. The computer implemented method according to claim 1, wherein for each on-site controller, the instructions comprise at least first instructions associated with a first portion of the demand curve and second instructions associated with a second portion of the demand curve, wherein the first and second instructions are the same.

9. The computer implemented method according to claim 1, wherein the obtaining energy usage information, identifying at least one distributed energy resource system in the plurality of distributed energy resource systems, and providing instructions are updated at at least one of a threshold time frequency and when a new electrical signal associated with a demand response curve is obtained.

10. The computer implemented method according to claim 1, wherein providing instructions comprises providing instructions only to on-site controllers identified as being able to provide energy to the grid.

11. The computer implemented method according to claim 1, wherein the on-site controllers are provided with instructions independently or in groups based on the geographic location of each distributed energy resource system, wherein groups of on-site controllers comprise a plurality of on-site controllers that are part of a feeder circuit.

12. The computer implemented method according to claim 1, the energy usage information comprising at least one of past energy generation, past energy storage, and past energy usage associated with each distributed energy resource system, real-time energy generation, real-time energy storage and real-time energy usage associated with each distributed energy resource system, projected energy generation, projected energy storage and projected energy usage associated with each distributed energy resource system during a time period associated with the demand response curve, geographic location of each distributed energy resource system, weather information associated with a geographic location of each distributed energy resource system, incident light associated with the at least one generation unit, age of the at least one storage unit, storage capacity of the at least one storage unit, age of the at least one generation unit, and generation capacity of the at least one generation unit.

13. The computer implemented method according to claim 1, the identifying comprising identifying based on at least one of past energy generation, past energy storage, and past energy usage associated with each distributed energy resource system, real-time energy generation, real-time energy storage and real-time energy usage associated with each distributed energy resource system, projected energy generation, projected energy storage and projected energy usage associated with each distributed energy resource system during a time period associated with the demand response curve, geographic location of each distributed energy resource system, weather information associated with a geographic location of each distributed energy resource system, incident light associated with the at least one generation unit, age of the at least one storage unit, storage capacity of the at least one storage unit, age of the at least one generation unit, and generation capacity of the at least one generation unit.

14. The computer implemented method according to claim 1, the identifying further comprising identifying, for each distributed energy resource system that can supply at least a portion of electrical energy identified in the demand response curve, a rate and duration for providing energy to the grid and wherein providing instructions associated with providing energy to the grid comprises instructions for providing energy in accordance with the identified rate and duration.

15. The computer implemented method according to claim 1, further comprising verifying the obtained energy usage information within a threshold time period prior to providing instructions, and updating the identifying at least one distributed energy resource system prior to the providing instructions to a plurality of on-site controllers when the obtained energy usage information has changed by a threshold amount.

16. The computer implemented method according to claim 1, wherein an output of each on-site controller is based on the provided instructions, and further comprising obtaining an electrical signal associated with energy output data based on actions of each on-site controller.

17. The computer implemented method according to claim 1, wherein providing instructions comprises instructions to control an auto transfer switch associated with the distributed energy resource element.

18. The computer implemented method according to claim 1, wherein identifying and providing instructions comprises prioritizing meeting current or projected on-site energy demands above providing energy to the grid.

19. A system for identifying and controlling distributed energy resources to meet requests for energy, the system comprising:
  a system controller configured to perform the steps comprising:
    obtaining an electrical signal associated with a demand response curve, the demand response curve comprising a request to provide electric energy to a grid, the demand response curve indicating electric energy demand over time;
    obtaining energy usage information associated with a plurality of distributed energy resource systems, each of the plurality of distributed energy resource systems located at a different consumer site and positioned on the grid side of a billing meter associated with the consumer site, each distributed energy resource system comprising at least one energy storage unit and at least one energy generation unit, the energy usage information obtained by communicating with each of the plurality of distributed energy resource systems, the energy usage information comprising information associated with energy that is at least one of stored in the at least one energy storage unit, and capable of being output by the at least one energy generation unit during a time associated with the demand response curve;
    identifying at least one distributed energy resource system in the plurality of distributed energy resource systems for providing energy to the grid, the identifying comprising identifying, based on the obtained energy usage information, at least one distributed energy resource system that can supply at least a portion of electric energy identified in the demand response curve; and
    providing instructions to a plurality of on-site controllers, wherein each on-site controller is associated with at least one distributed energy resource system and each on-site controller is configured to: control the at least one storage unit to provide energy to the grid, control the at least one energy generation unit to provide energy to the grid, and control the at least one energy generation unit to provide energy to the at least one storage unit, the providing instructions comprises providing instructions to control the at least one storage unit to provide energy to the grid when a first condition is met, control the at least one energy generation unit to provide energy to the grid when a second condition is met, and control the at least one energy generation unit to provide energy to the at least one storage unit when a third condition is met.

20. A non-transitory computer readable medium comprising instructions that when executed by a processor cause the processor to perform the steps comprising:
  obtaining an electrical signal associated with a demand response curve, the demand response curve comprising a request to provide electric energy to a grid, the demand response curve indicating electric energy demand over time;
  obtaining energy usage information associated with a plurality of distributed energy resource systems, each of the plurality of distributed energy resource systems located at a different consumer site and positioned on the grid side of a billing meter associated with the consumer site, each distributed energy resource system comprising at least one energy storage unit and at least one energy generation unit, the energy usage information obtained by communicating with each of the plurality of distributed energy resource systems, the energy usage information comprising information associated with energy that is at least one of stored in the at least one energy storage unit, and capable of being output by the at least one energy generation unit during a time associated with the demand response curve;
  identifying at least one distributed energy resource system in the plurality of distributed energy resource systems for providing energy to the grid, the identifying comprising identifying, based on the obtained energy usage information, at least one distributed energy resource system that can supply at least a portion of electric energy identified in the demand response curve; and
  providing instructions to a plurality of on-site controllers, wherein each on-site controller is associated with at least one distributed energy resource system and each on-site controller is configured to: control the at least one storage unit to provide energy to the grid, control the at least one energy generation unit to provide energy to the grid, and control the at least one energy generation unit to provide energy to the at least one storage unit, the providing instructions comprises providing instructions to control the at least one storage unit to provide energy to the grid when a first condition is met, control the at least one energy generation unit to provide energy to the grid when a second condition is met, and control the at least one energy generation unit to provide energy to the at least one storage unit when a third condition is met.

\* \* \* \* \*